(12) United States Patent
Ha et al.

(10) Patent No.: US 11,214,341 B2
(45) Date of Patent: Jan. 4, 2022

(54) CHANGEABLE COVER FOR CHAIR BACKPLATE BETWEEN COVER AND LIFE VEST

(71) Applicant: Jin Seok Ha, Seoul (KR)

(72) Inventors: Jin Seok Ha, Seoul (KR); Hee Won Jin, Wonju-si (KR)

( * ) Notice: Subject to any disclaimer, the term of this patent is extended or adjusted under 35 U.S.C. 154(b) by 0 days.

(21) Appl. No.: 16/303,799

(22) PCT Filed: Jul. 4, 2018

(86) PCT No.: PCT/KR2018/007531
§ 371 (c)(1),
(2) Date: Nov. 21, 2018

(87) PCT Pub. No.: WO2020/009254
PCT Pub. Date: Jan. 9, 2020

(65) Prior Publication Data
US 2021/0221487 A1    Jul. 22, 2021

(51) Int. Cl.
*B63C 9/115* (2006.01)
*B64D 25/04* (2006.01)

(52) U.S. Cl.
CPC .............. *B63C 9/115* (2013.01); *B64D 25/04* (2013.01)

(58) Field of Classification Search
CPC ............ B63C 9/115; B63C 9/30; B64D 25/04
See application file for complete search history.

(56) References Cited

U.S. PATENT DOCUMENTS

| | | | | |
|---|---|---|---|---|
| 2,629,118 A | * | 2/1953 | Frieder | B63C 9/115 441/110 |
| 5,335,882 A | | 8/1994 | Bonacci | |
| 2007/0135005 A1 | * | 6/2007 | Whitney | B63C 9/30 441/127 |
| 2011/0004968 A1 | * | 1/2011 | Morgan | F41H 5/0471 2/2.5 |

FOREIGN PATENT DOCUMENTS

| | | |
|---|---|---|
| JP | 3180593 U * | 12/2012 |
| KR | 10-1120524 B1 | 3/2012 |
| KR | 10-1647297 B1 | 8/2016 |

* cited by examiner

*Primary Examiner* — Stephen P Avila
(74) *Attorney, Agent, or Firm* — LRK Patent Law Firm

(57) ABSTRACT

The present invention relates to a cover that is used as a backrest cover in daily use and also as a life jacket in an emergency. More particularly, the present invention relates to a backrest cover including: a front portion configured to cover a front surface of the backrest; a rear portion configured to cover a rear surface of the backrest; a connector configured to extend across an upper end of the backrest, connecting the front and back portions; and a buoyancy body provided in at least one of the front portion, the rear portion, and the connector.

4 Claims, 13 Drawing Sheets

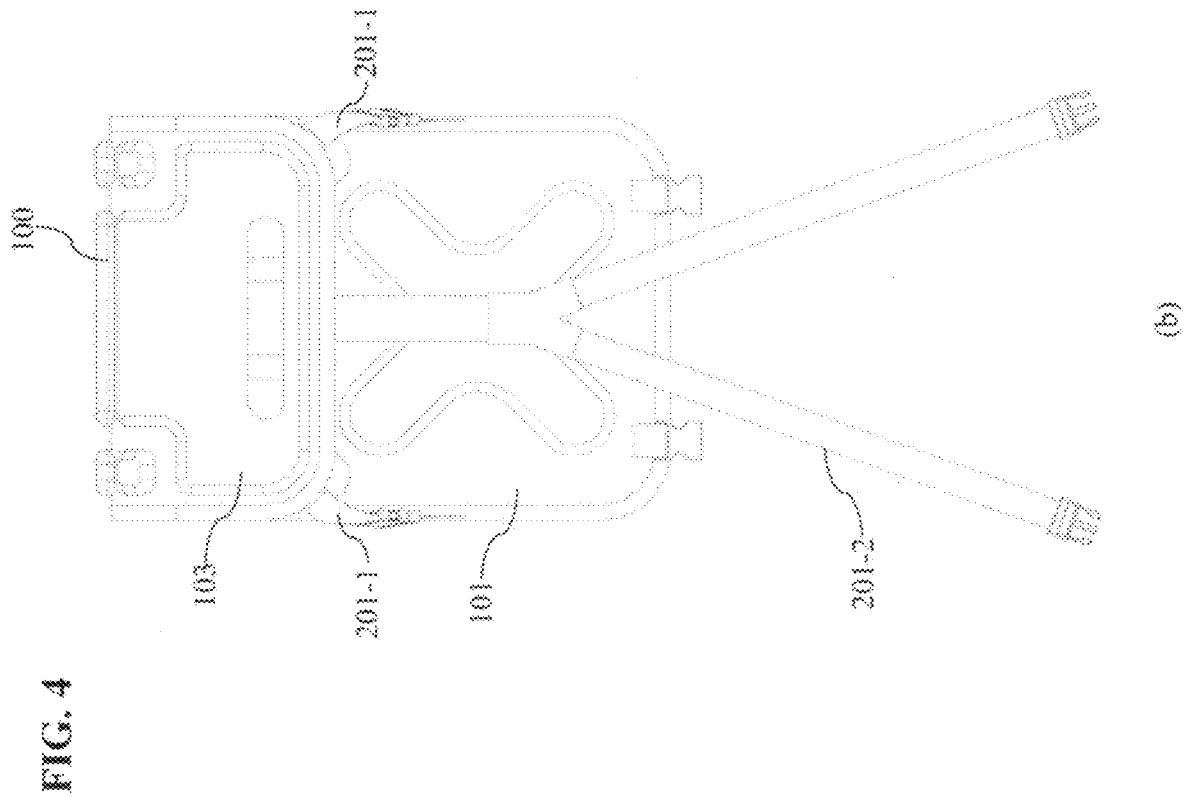
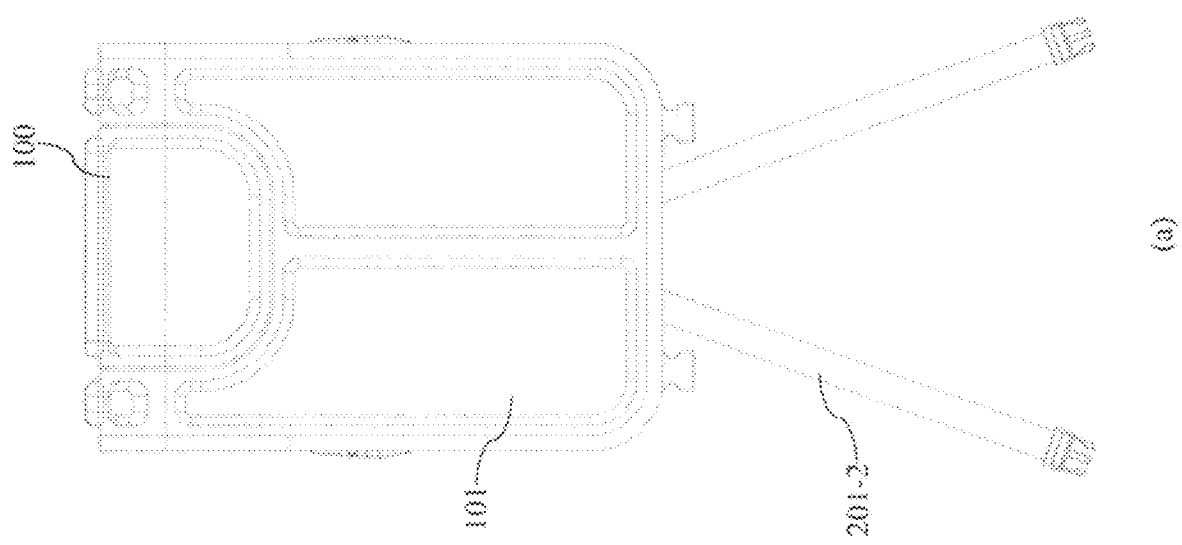
FIG. 4

CHANGEABLE COVER FOR CHAIR BACKPLATE BETWEEN COVER AND LIFE VEST

BACKGROUND

1. Field of the Invention

The present invention relates to a backrest cover which can be changed into a life jacket, and more particularly, to a backrest cover having a first surface on which may be used as a chair cover and a second surface on which it may be used as a life jacket.

2. Description of Related Art

Today, government regulations that require life-saving goods to be proportionate to a certain number of people are being reinforced in places where large accidents may occur, such as marine vessels. However, problems occur in limited areas and capacities of ships in order to comply with such regulations. Life-saving articles that are simplified, miniaturized, or variable have been developed in order to solve such problems. However, some issues such as difficulty in application of such miniaturized or variable life-saving articles to limited marine areas and difficulty in achieving the purpose of human rescue due to limited functions of the miniaturized or variable life-saving articles are emerging.

U.S. Pat. No. 5,335,882, which relates to a seat cushion for an airplane chair that can be transformed into a life jacket, is characterized in that a cushion provided on the base of a chair is transformed into a life jacket such that a user can easily grasp a position of the life jacket and quickly wear the life jacket, but has a drawback that it cannot be applied to an existing chair and it is necessary to replace all existing chairs to provide the life jacket.

In another aspect, in the case of the US Registration patent, there is a discomfort to wear because a buoyancy material is used as a cushion of the chair and the neck and arm portions must be dismantled before wearing.

SUMMARY OF THE INVENTION

Accordingly, it is required to study a life jacket that can be easily applied intuitively to anyone who can use the seat as a life jacket while being able to apply it to a chair installed as it is in an airplane or a ship.

An object of the present invention is to solve the aforementioned problems and other problems. Another object of the present invention is to provide a cover which can be used as a backrest cover in daily use by being applied to a chair previously installed on an airplane or a ship and can be changed into a life jacket in an emergency.

Technical objects desired to be achieved in the present invention are not limited to the aforementioned objects, and other technical objects not described above will be apparent to those skilled in the art from the disclosure of the present invention.

For achieving the objects or other objects, an aspect of the present invention provides a backrest cover including: a front portion configured to cover a front surface of the backrest; a rear portion configured to cover a rear surface of the backrest; a connector configured to extend across an upper end of the backrest, connecting the front and back portions; and a buoyancy body provided in at least one of the front portion, the rear portion, and the connector.

Advantageous Effects

Effects of the backrest cover according to the exemplary embodiment of the present invention will be described as follows.

According to at least one of the embodiments of the present invention, there is an advantage that it can be easily applied to an existing aircraft or ship.

In addition, according to at least one embodiment of the present invention, there is an advantage that it can be used as a backrest cover that can give a cushion feeling in daily use, and can easily be changed to a life jacket in an emergency.

The additional range of applicability of the present invention will become apparent from the following detailed description. However, since various modifications and alternations within the spirit and scope of the present invention may be clearly understood by those skilled in the art, it is to be understood that a detailed description and a specific exemplary embodiment of the present invention such as an exemplary embodiment of the present invention are provided only by way of example.

DESCRIPTION OF THE DRAWINGS

FIG. 4 illustrates (a) a front view and (b) a rear view of the backrest cover 100 according to an exemplary embodiment of the present invention.

DETAILED DESCRIPTION OF THE INVENTION

Figure 1:
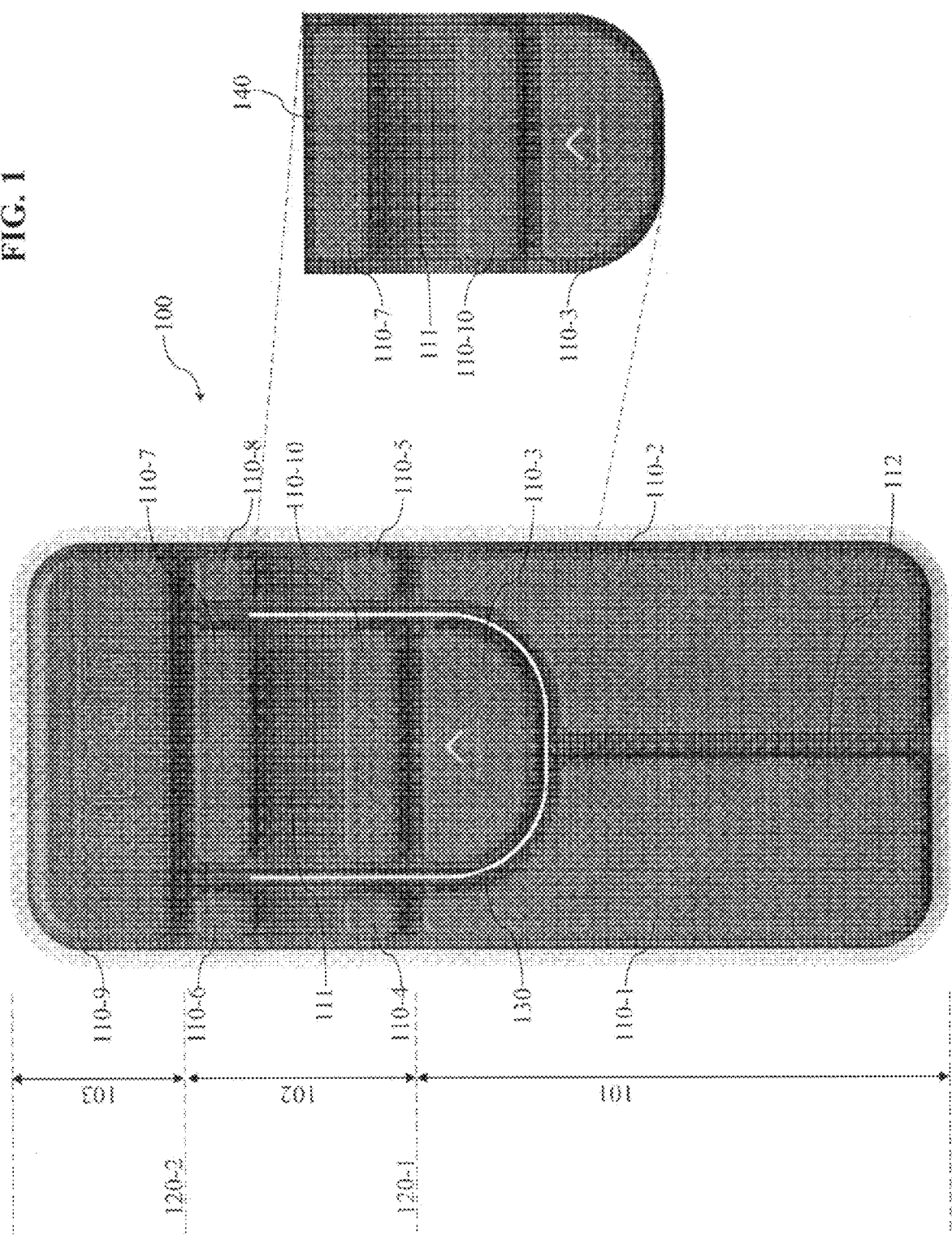
FIG. 1 illustrates an unfolded state of a chair backrest cover 100 (hereinafter, referred to as backrest cover) according to an exemplary embodiment of the present invention.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and "unit" for components used in the following description are used only in order to easily make a specification. Therefore, these terms do not have meanings or roles that distinguish them from each other in themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

In the present invention, a cover that may be used as a backrest cover for a chair previously installed on an airplane or a ship in daily use, but may be used as a life jacket which can be easily worn by a user in an emergency. These exemplary embodiments will be described in detail with reference to the following drawings.

Figure 2:
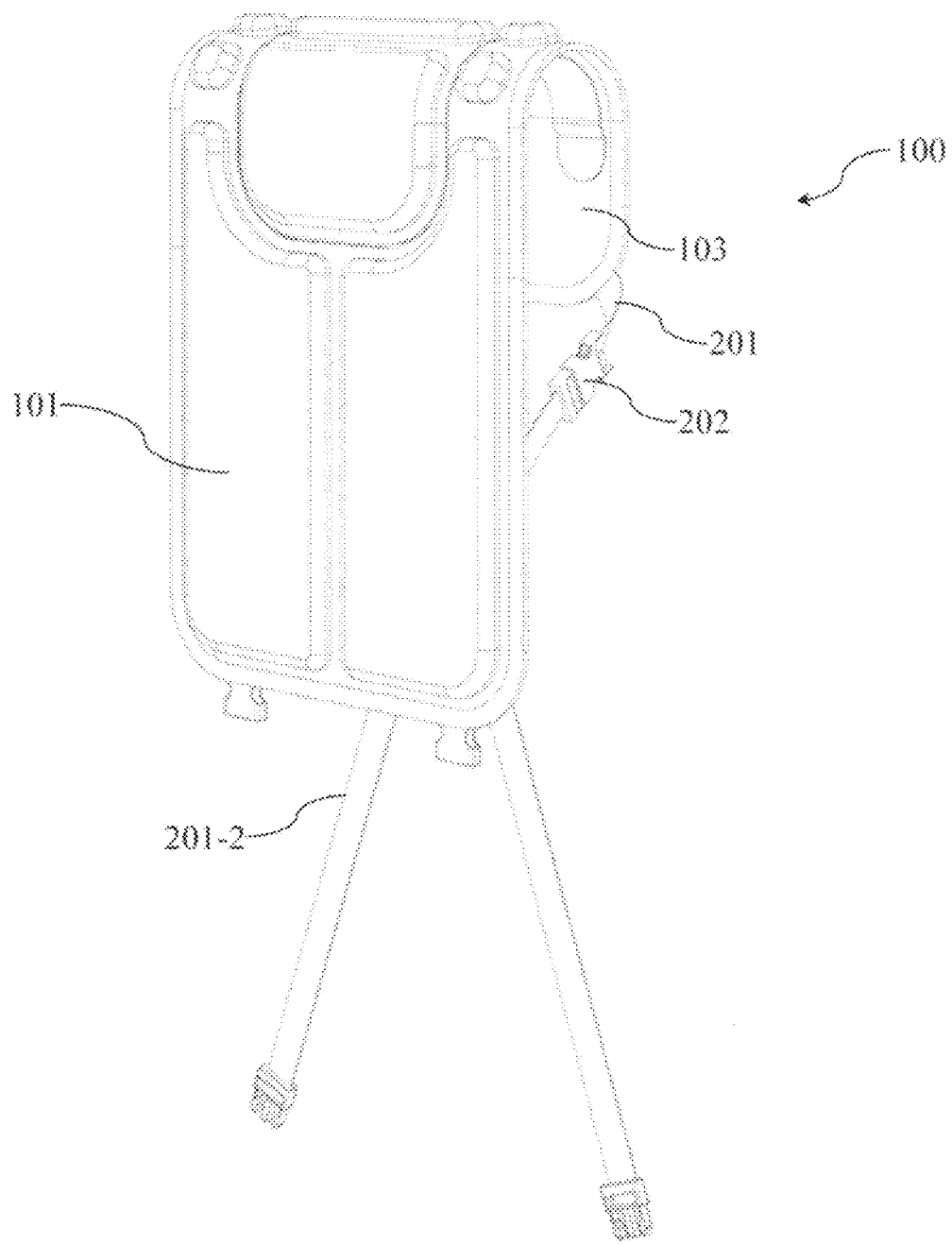
FIG. 2 illustrates a perspective view of the backrest cover 100 according to an exemplary embodiment of the present invention.
Figure 3:
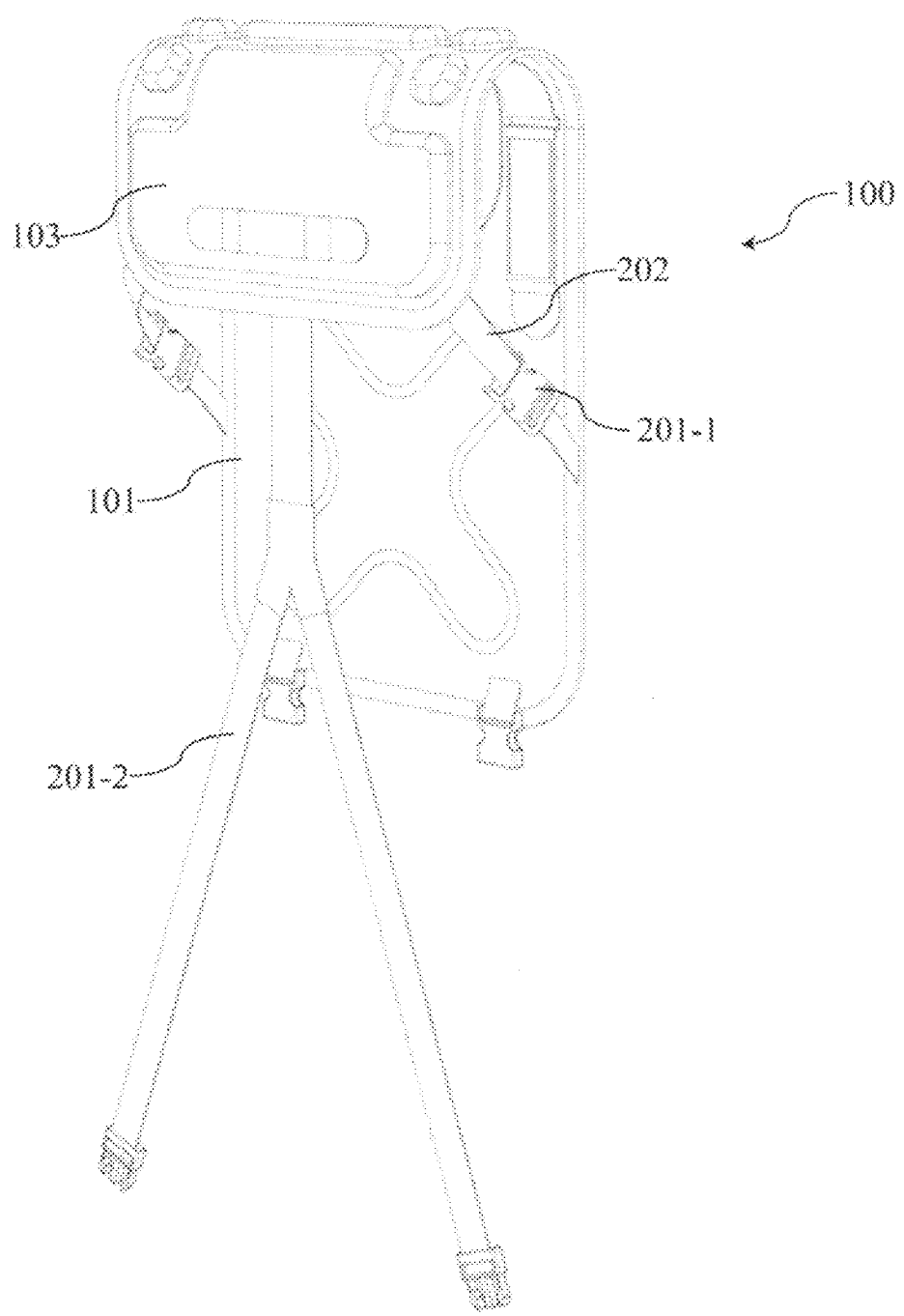
FIG. 3 illustrates a rear perspective view of the back cover 100 according to an exemplary embodiment of the present invention.
Figure 5:
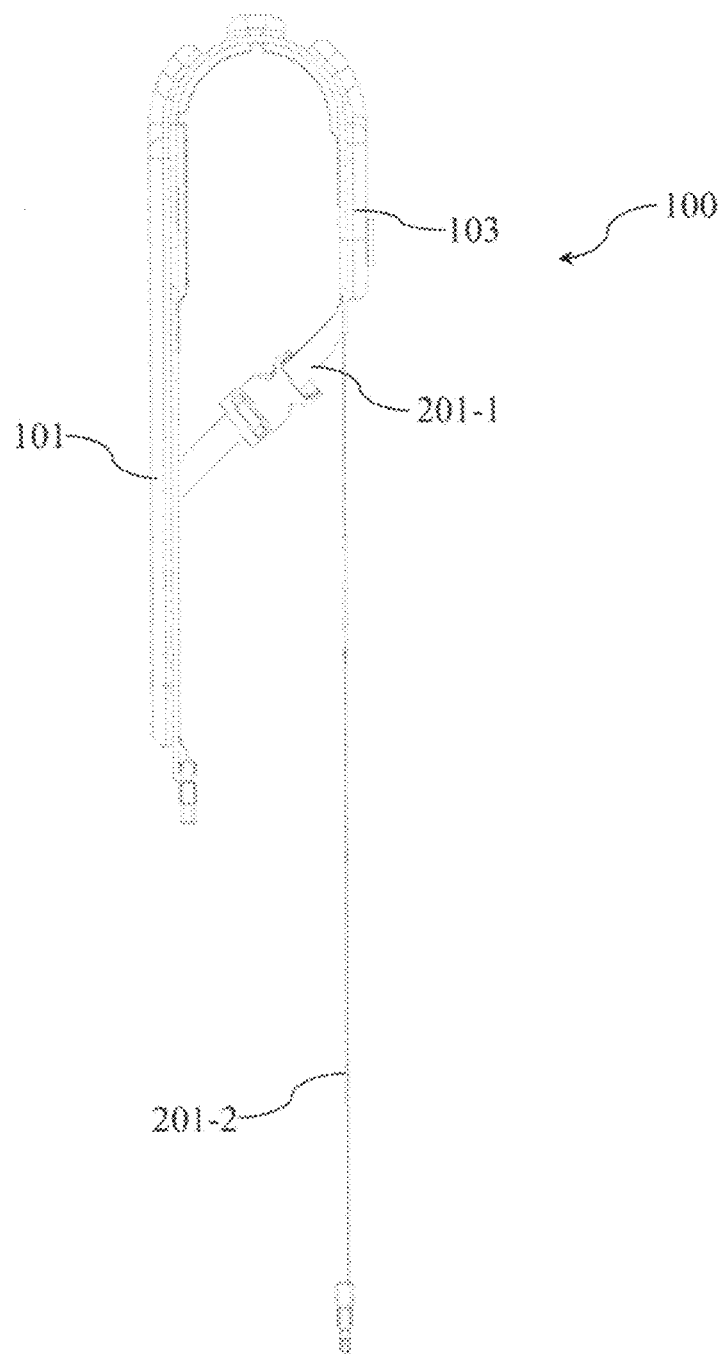
FIG. 5 illustrates a side view of the backrest cover 100 according to an exemplary embodiment of the present invention.
Figure 6:
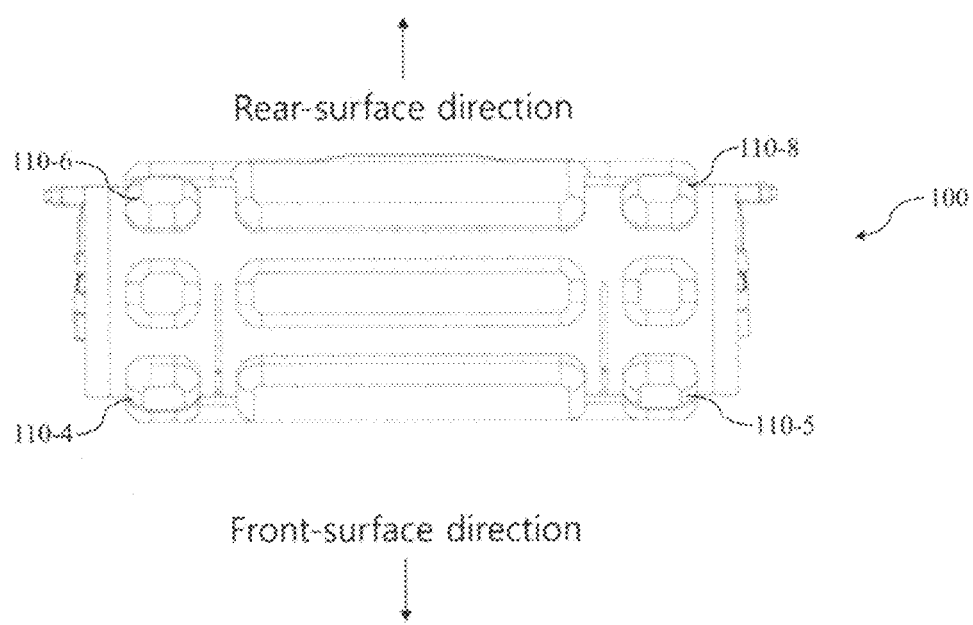
FIG. 6 illustrates a plan view of the backrest cover 100 according to an exemplary embodiment of the present invention.

FIG. 1 illustrates an unfolded state of a chair backrest cover 100 (hereinafter, referred to as backrest cover) according to an exemplary embodiment of the present invention. FIG. 2 illustrates a perspective view of the backrest cover 100 according to an exemplary embodiment of the present invention. FIG. 3 illustrates a rear perspective view of the back cover 100 according to an exemplary embodiment of the present invention. FIG. 4 illustrates (a) a front view and (b) a rear view of the backrest cover 100 according to an exemplary embodiment of the present invention. FIG. 5 illustrates a side view of the backrest cover 100 according to an exemplary embodiment of the present invention. The side view of FIG. 5 is a right side view, but the left side view is symmetrical to a right side view thereof, and thus is substantially the same as the right side thereof, which will be omitted. FIG. 6 illustrates a plan view of the backrest cover 100 according to an exemplary embodiment of the present invention.

According to an exemplary embodiment of the present invention, the backrest cover 100 for covering a backrest may include a front portion 101 for covering a front surface of the backrest, a rear portion 103 for covering a rear surface of the backrest, a connector for connecting the first portion 101 and the rear portion 103, and a buoyant body 110 provided in at least one of the first portion 101, the rear portion 103, and the connector 102.

In this case, the buoyant body 110 may be a solid buoyant body. The solid buoyancy body may be formed by processing a foamed resin such as a foam formed by foaming a synthetic resin such as polyethylene (PE), PVC, Nitrile-butadiene rubber (NBR), EVA or the like into a plate shape.

The NBR, which is a synthetic rubber product made by a low temperature emulsion polymerization method using acrylonitrile and butadiene, has excellent oil resistance to be used for fuel hoses, shoe soles, automobile parts, and the like, and is a material that can be used as a PVC modifier because of its excellent compatibility with PVC.

Hereinafter, the present exemplary embodiment will be described with reference to FIG. 1 to FIG. 6.

Referring to FIG. 1, according to the present exemplary embodiment, the backrest cover 100 may be provided in a rectangular plate shape in which the front portion 101, the connector 102 and the rear portion 103 are integrally formed without being distinguished. Although the rectangular plate shape is illustrated in an unfolded state, when the connector 102 spreads over an upper end of the backrest, the front portion 101 and the rear portion 103 may respectively cover a front surface and a rear surface of the backrest as the connector 102 is naturally bent (see FIG. 13).

In this case, it is not limited to the rectangular plate shape, and any shape may be used as long as it can cover the front or rear surface of the backrest. In particular, it will be obvious that edges of the rectangular plate shape can be rounded for convenience of design or use.

In addition, as illustrated in FIG. 1, buoyant bodies 110-1 to 110-10 may be provided in at least one of the front portion 101, the rear portion 103, and the connector 102.

Such buoyant bodies 110-1 to 110-10 may provide buoyancy when the cover is transformed into a life jacket, but it may serve as a cushion when used as a backrest to improve a sitting feeling of a person sitting on a chair.

In this case, front buoyant bodies 110-1 and 110-2 provided in the front portion 101 may have more areas (volumes) than a rear buoyant body ($9^{th}$ buoyant body 110-9) provided in the rear portion 103. A front buoyancy of a wearer who is wearing a life jacket needs to be higher, so that even when the wearer is unconscious, a respirator may naturally be guided out of the water, and the safety may be ensured, such as floating in a comfortable lying state. That is, the front buoyant bodies 110-1 and 110-2 may be provided to have more buoyancy than the rear buoyant body 110-9.

In addition, as illustrated in FIG. 1, the buoyant body may be provided so as to be divided into left and right portions when provided in the front portion 101. In general, the life jacket should be designed such that the wearer can easily get out of the water. Accordingly, the water must be drained from the life jacket quickly, in order to make it possible with less force to lift a person. To this end, in the present exemplary embodiment, it is proposed that the front buoyant bodies 110-1 and 110-2 provided in the front portion 101 is divided into a first buoyant body 110-1 provided at the left and a second buoyant body 110-2 provided at the right, and a drainage passage 112 through which water can be drained is formed therebetween.

If the water easily escapes through the drainage passage 112, it will be able to do so with less force when lifting a person who is in the water to land or ship.

Further, the buoyant bodies 110-1 to 110-10 may be divided depending on a position where the bending is performed. For example, a first boundary 120-1 between the front portion 101 and the connector 102 is a position where the bending is performed by the upper end of the backrest. Similarly, a second boundary between the rear portion 103 and the connector 102 is also a position where the bending is performed by the upper end of the backrest.

The first buoyant body 110-1 and the fourth buoyant body 104 are separately provided, and the second buoyant body 110-2 and the fifth buoyant body 110-5 are separately provided in the same manner, to perform the bending well at the first boundary 120-1.

The sixth buoyant body 110-6 and the rear buoyant body (ninth buoyant body, 110-9), the seventh buoyant body 110-7 and the rear buoyant body (ninth buoyant body) 110-9, and the eighth buoyant body 110-8 and the rear buoyant body (ninth buoyant body) 110-9 are separately provided to perform the bending well at the second boundary 120-2.

Further, as will be described later, the third buoyant body 110-3 and the front buoyant body 110-1 and 110-2, the fourth and tenth buoyant bodies 110-4 and 110-10, the fifth and tenth buoyant bodies 110-5 and 110-10, the sixth and seventh buoyant bodies 110-6 and 110-7, and the eighth and seventh buoyant bodies 110-8 and 110-7 may be separated from each other.

According to the present exemplary embodiment, the backrest cover 100 may include a cutting line 130 (e.g., U-shape) to form a neck opening through which a head of the wearer passes when it is used as a life jacket. As illustrated in FIG. 1, the wearer may enable the head of the wearer to pass through the neck opening that is cut by the cutting line 130 to wear it on the neck.

According to the present exemplary embodiment, the cutting line for forming the neck opening is proposed to have a shape in which one side is left and the other side is cut. This is to support a back portion of the neck of the wearer by using a cut portion fixed by fixing a uncut portion. When cut in this manner, a portion that is opened by being cut by the portion that is fixed because it is not cut may be fixed in the form of hanging on the backrest cover 100.

The opened portion is referred to as neck support 140 for describing the present invention. In the present exemplary embodiment, it is proposed that when a wearer wears a life jacket, the buoyancy of the neck support 140 itself may be used to support the head or neck of the wearer. As a result, the wearer will be able to survive for a long time by taking a comfortable posture when floating in water. For this purpose, the uncut portion may be the back portion of the neck of the wearer.

In the present exemplary embodiment, the neck support 140 may be divided into a plurality of buoyancy bodies 110-3, 110-10, and 110-7 as illustrated therein. Since the buoyant bodies 110-3, 110-10, and 110-7 that are divided into a plurality of portions are easy to bend when opened as described above, the wearer's neck may be comfortably supported in a bent state. For this purpose, the buoyant bodies 110-3, 110-10, and 110-7 may be divided in a horizontal direction.

Furthermore, in another exemplary embodiment of the present invention, the neck support 140 may also be provided in the form of a rolled-up drum. The buoyant bodies 110-3, 110-10 and 110-7 may be provided to be divided into a larger number of pieces so as to be provided in a rolled-up shape.

Meanwhile, in the present exemplary embodiment, it is proposed that the neck support 140 is further provided with a handle 111. In an emergency situation, the handle 111 is for easily lifting the backrest cover 100 from the backrest when a person who wants to use the handle 111 holds the handle 111 and pulls the handle 100 in an upward direction.

Further, in the present exemplary embodiment, in order to be effectively fixed to the backrest, as illustrated in FIG. 2 and FIG. 3, it is proposed that a first fastening band 201-1 for fixing the front portion 101 and the rear portion 103 to each other is further provided.

As described above, the backrest cover 100 of the present invention will have to function effectively as a backrest cover in a normal situation, instead of in an emergency situation. Accordingly, it should be effectively fixed to the seat back without being simply held on the seat back. To this end, in the present embodiment, the first fastening band 201-1 for fixing the front portion 101 and the rear portion 103 to each other is required. In addition, when used as a life jacket, the first fastening band 201-1 may be required to be effectively fixed to the wearer's body.

As illustrated in the drawing, a first end of the first fastening band 201-1 may be fastened to a lower end of the rear portion 103, and a second end of the first fastening band 201-1 may be fastened to a side surface of the front portion 101. This is because the front portion 101 may be formed to be relatively longer than the rear portion 103 as described above. Particularly, the first end of the first fastening band 201-1 may be fastened in an obliquely diagonal direction from a bottom edge of the rear portion 103. This is because it is necessary to be connected to the front portion 101 in a wrapping manner along the side of the backrest. In this case, the first end of the first fastening band 201-1 may be connected to an edge of the rounded square shape.

In addition, in the present exemplary embodiment, a buckle 202 is provided in the middle of the first fastening band 201-1. Thus, the buckle 202 is provided so that the wearer can easily separate the front portion 101 and the rear portion 103 by detaching and attaching the buckle 202. For example, the front portion 101 and the rear portion 103 may be separated through the buckle 202 for ease of wearing/taking off the life jacket.

Particularly, it is obvious that the first fastening bands 201-1 are provided at left and right ends of the front portion 101, respectively, so that both the right and left fastening bands can be fastened/fixed.

In addition, in the present exemplary embodiment, it is proposed to further include a second fastening band 201-2 for connecting the front portion 101 and the rear portion 103, as illustrated in FIG. 3. The second fastening band 201-2, which is fastened as such, is not required to be simply fixed to the backrest, but is required to completely secure the wearer's body when used as a life jacket.

A first end of the second fastening band 201-2 may be fastened to the lower end of the rear portion 103, and the second fastening band 201-2 is divided into two halves in a 'Y' form, two second ends of which may be fastened to the left and right of the lower end of the front portion 101, respectively. The reason that it is divided into two halves is for the second fastening band 201-2 to wrap the wearer from a inguinal region thereof in a thigh direction. This is because the life jacket is forced upward by the buoyancy force, and if a directly upward force is applied from the inguinal region itself, it may cause inconvenience.

The first and second fastening bands 201-1 and 201-2 described above may be provided with a material having an elastic force.

In the present exemplary embodiment, it is proposed that a surface used as a backrest cover be turned over and used as a life jacket. This is because a configuration required for simple use as a backrest is different from the configuration required for use as a life jacket Accordingly, constituent elements described with reference to FIG. 1 to FIG. 6, are related to a surface that can be used as a backrest cover (hereinafter, referred to as a backrest surface), and hereinafter, a surface that can be used as a life jacket (hereinafter, referred to as a life jacket surface) will be described with reference to FIG. 7 to FIG. 12.

Figure 7:
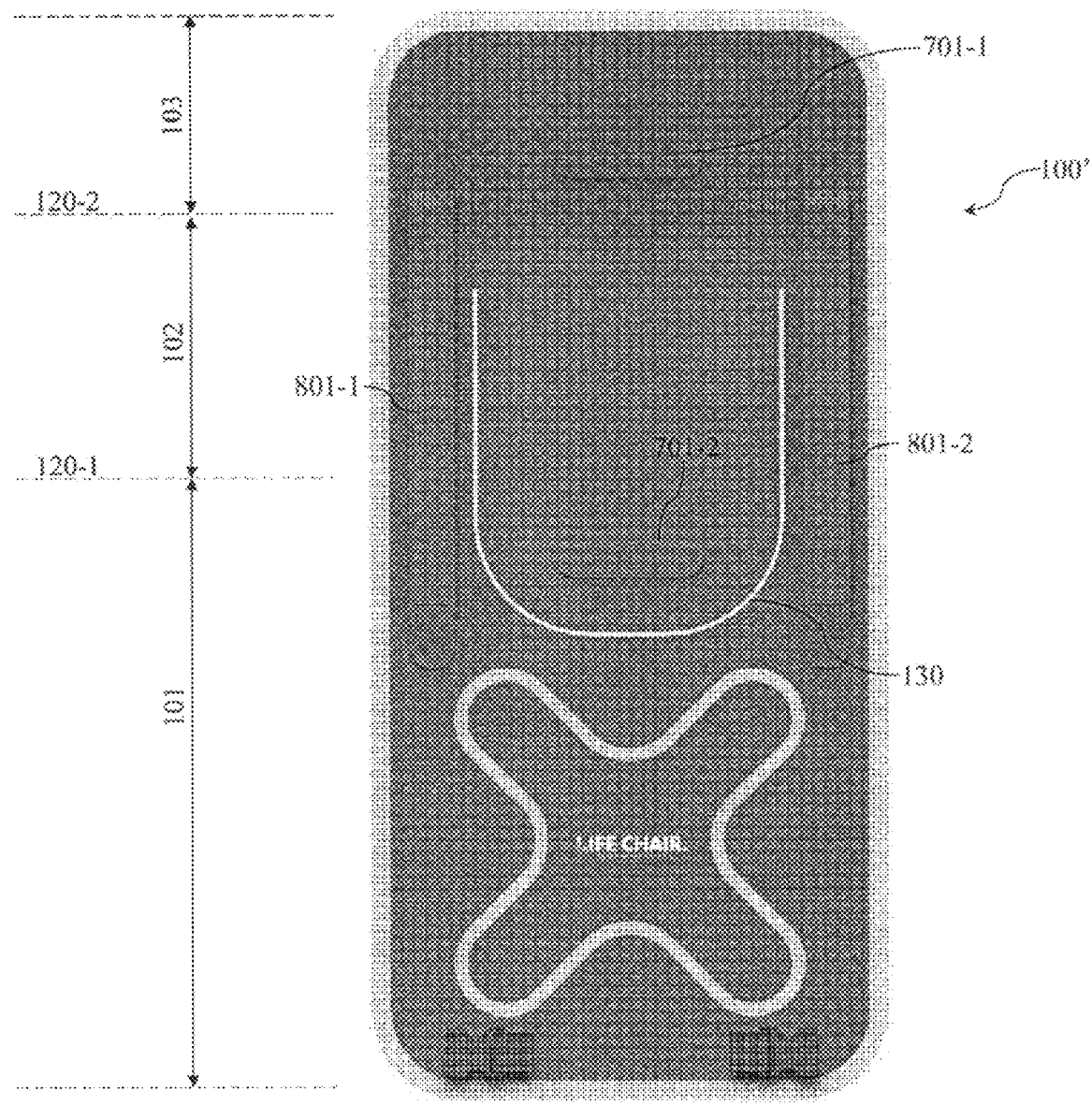
FIG. 7 illustrates an unfolded state of a life-jacket surface of the backrest cover 100 according to an exemplary embodiment of the present invention.
Figure 8:
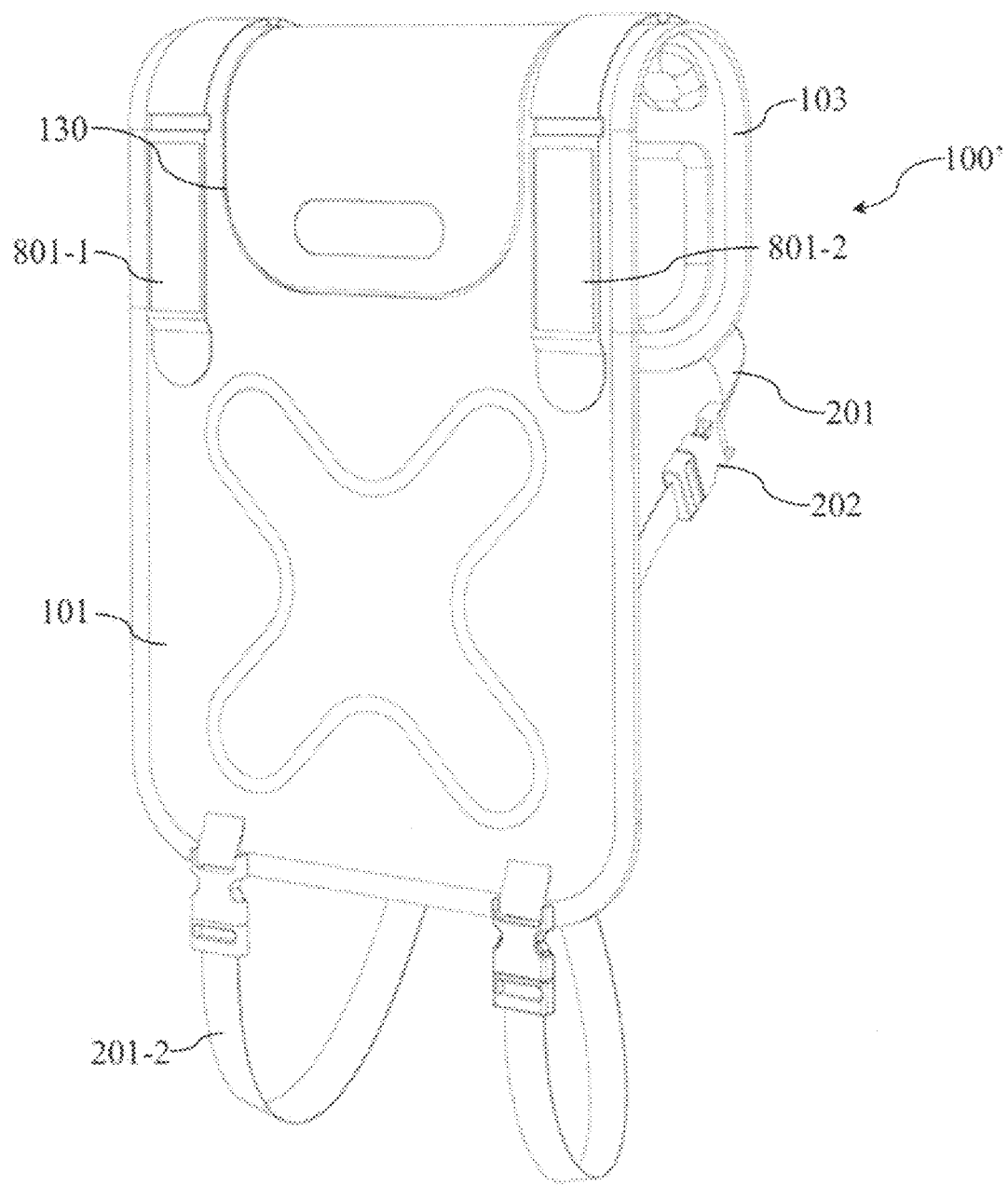
FIG. 8 illustrates a perspective view of the life-jacket surface of the backrest cover 100 according to an exemplary embodiment of the present invention.
Figure 9:
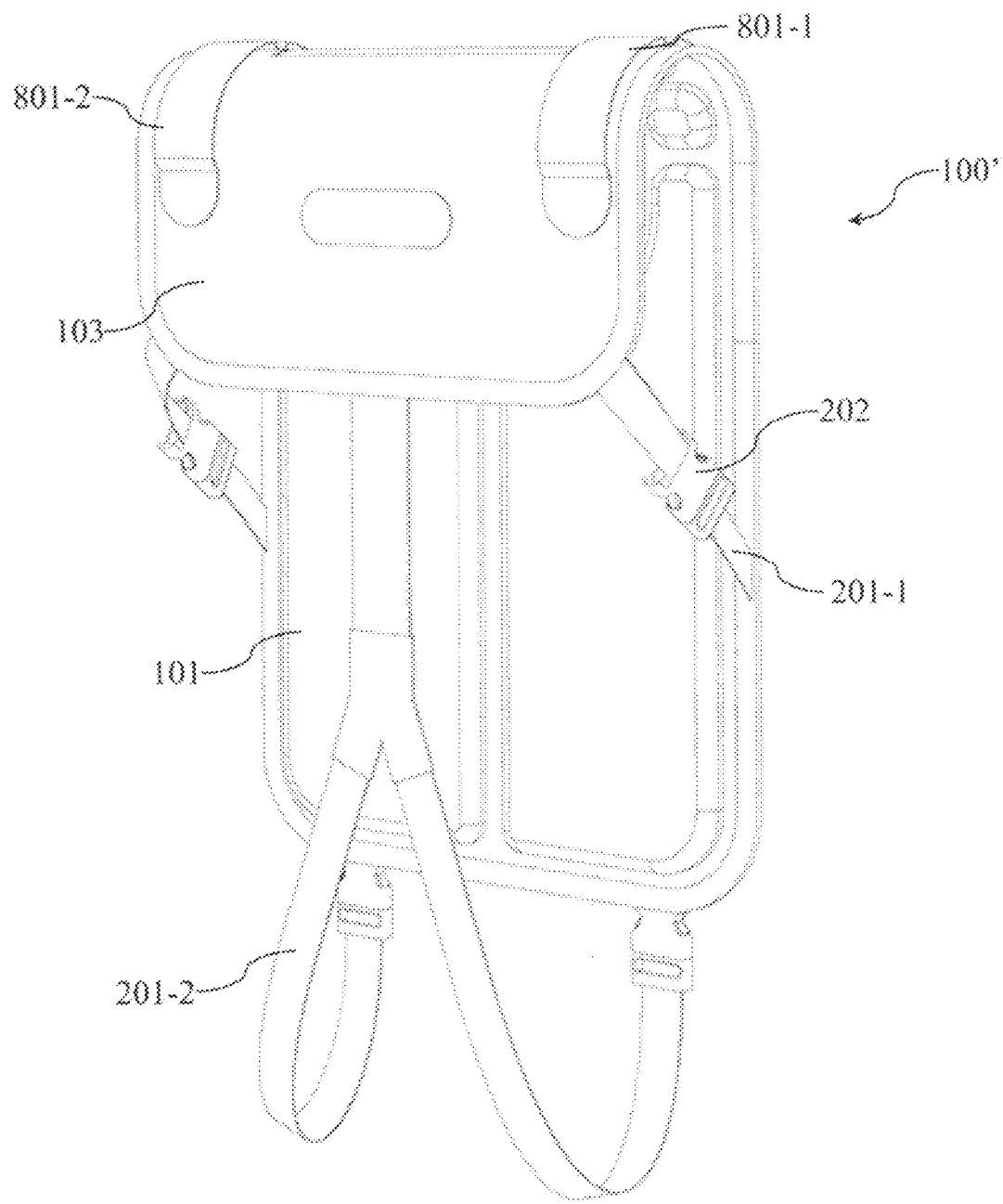
FIG. 9 illustrates a rear perspective view of the life-jacket surface of the backrest cover 100 according to an exemplary embodiment of the present invention.
Figure 10:
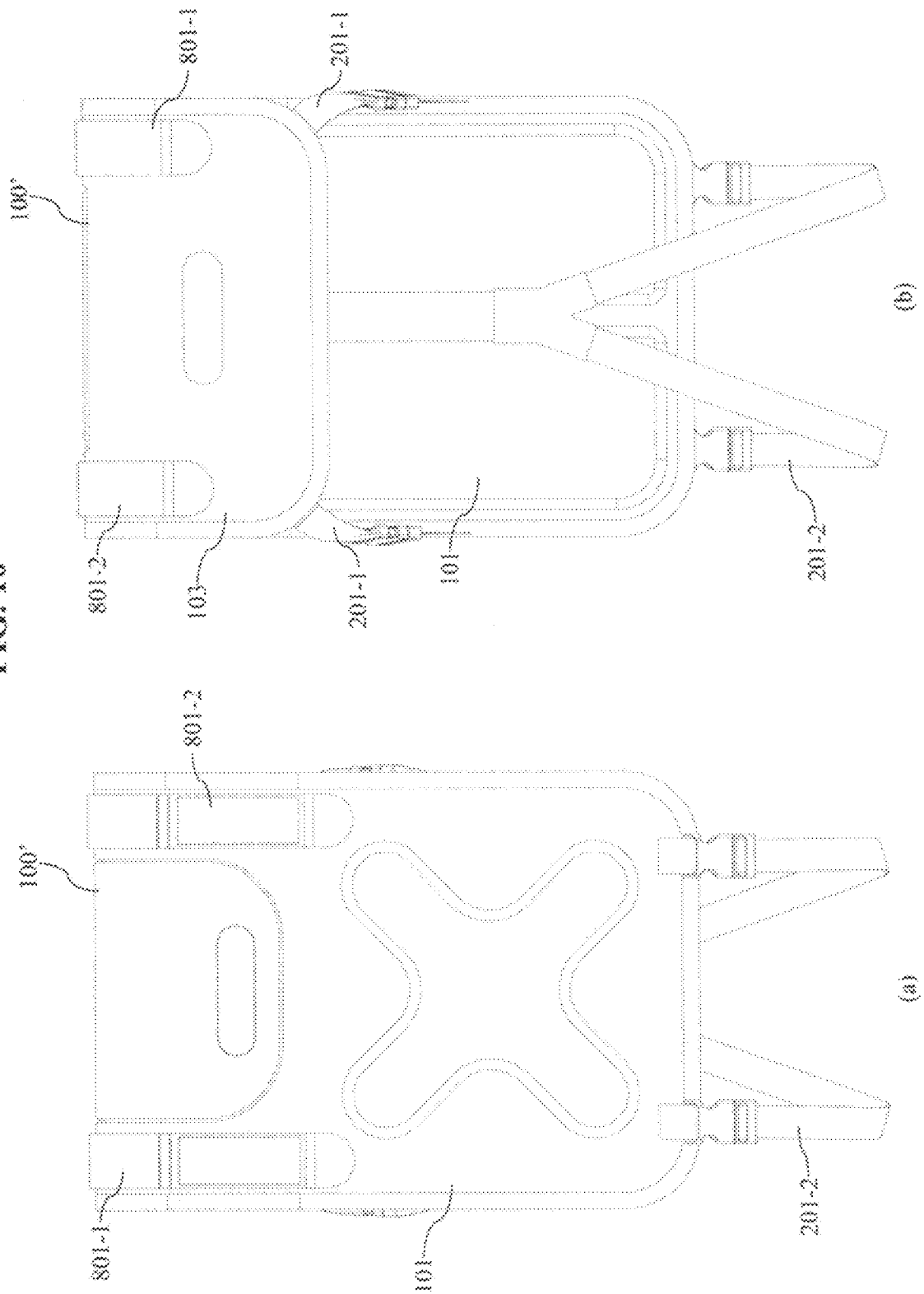
FIG. 10 illustrates (a) a front view and (b) a rear view of the life-jacket surface of the backrest cover 100 according to an exemplary embodiment of the present invention.
Figure 11:
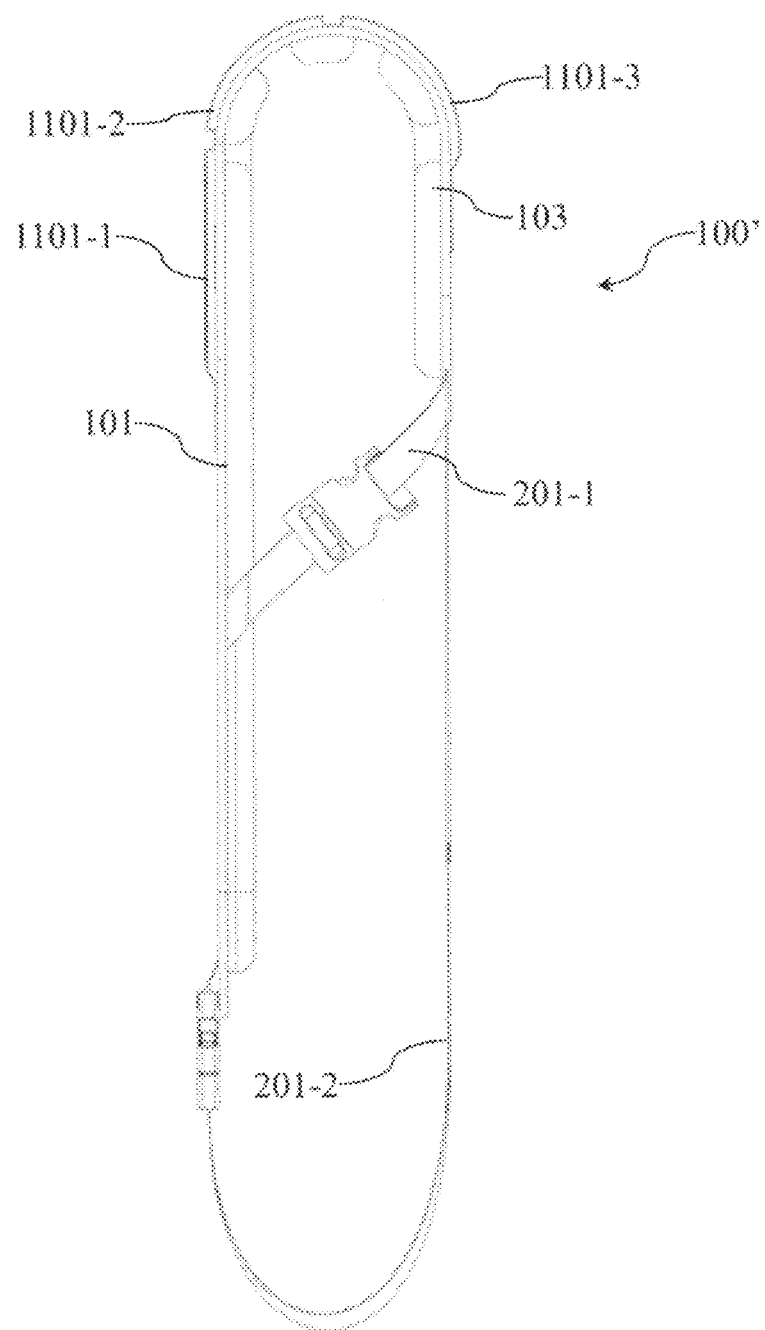
FIG. 11 illustrates a side view of the life-jacket surface of the backrest cover 100 according to an exemplary embodiment of the present invention.
Figure 12:
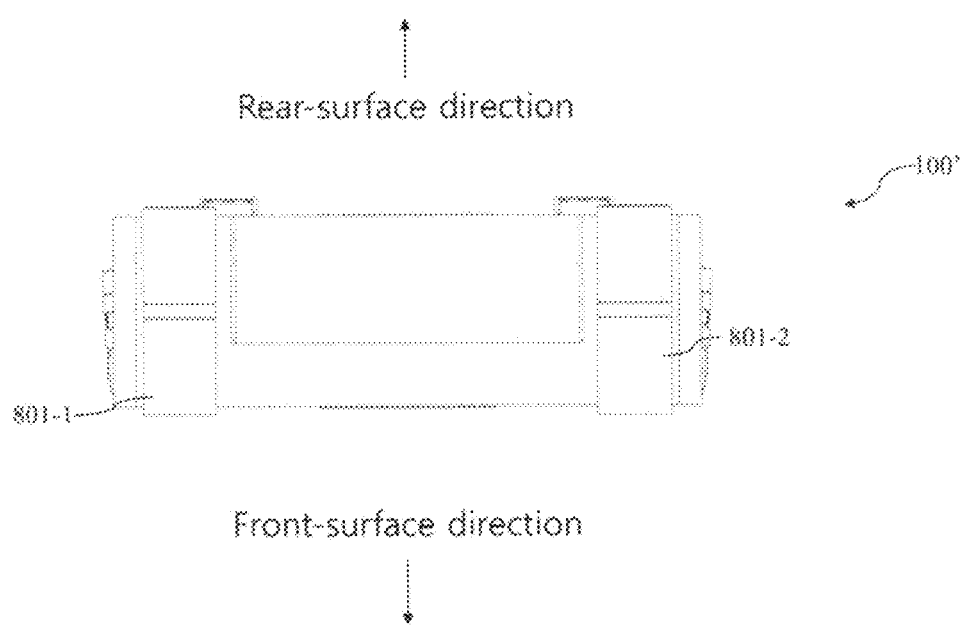
FIG. 12 illustrates a plan view of the life-jacket surface of the backrest cover 100 according to an exemplary embodiment of the present invention.

FIG. 7 illustrates an unfolded state of a life-jacket surface of the backrest cover 100 according to an exemplary embodiment of the present invention. FIG. 8 illustrates a perspective view of the life-jacket surface of the backrest cover 100 according to an exemplary embodiment of the present invention. FIG. 9 illustrates a rear perspective view of the life-jacket surface of the backrest cover 100 according to an exemplary embodiment of the present invention. FIG. 10 illustrates (a) a front view and (b) a rear view of the life-jacket surface of the backrest cover 100 according to an exemplary embodiment of the present invention. FIG. 11 illustrates a side view of the life-jacket surface of the backrest cover 100 according to an exemplary embodiment of the present invention. The side view of FIG. 11 is a right side view, but the left side view is symmetrical to a right side view thereof, and thus is substantially the same as the right side thereof, which will be omitted. FIG. 12 illustrates a plan view of the life-jacket surface of the backrest cover 100 according to an exemplary embodiment of the present invention.

In the following description, since the life jacket surface is opposite to the backrest surface, a description of a common portion will be omitted. Constituent elements of the life jacket surface that are different from those of the backrest surface will mainly be described. The backrest cover 100 of the life jacket surface will be referred to as a life jacket 100' for convenience of description.

A surface of the life jacket 100' may be coated with a fluorescent material or may be provided in a fluorescent color. This is because the life jacket 100' needs to be conspicuous when drifting in the sea or the like.

Referring to FIG. 7, handles 801-1 and 801-2 may be formed in at least one of the front portion 101, the connector 102, and the rear portion 103 of the life jacket 100'. This is because it is necessary to provide a handle on the surface of the life jacket 100' in order to pull the person wearing the life jacket 100' out of the water. To this end, in the present exemplary embodiment, it is proposed to provide the handles 801-1 and 801-2.

Particularly, according to the present exemplary embodiment, it is proposed to provide the handles 801-1 and 801-2 at left and right sides of the life jacket 100'. This is for efficiency and convenience of survival. That is, when both the grips 801-1 and 801-2 are pulled up by both hands, even a heavy person can easily pull up and rescued.

Particularly, the handles 801-1 and 801-2 may be vertically longitudinally formed to entirely cover the front portion 101, the connector 102, and the rear portion 103 (see the drawings illustrated)

This is because a drifting person may be pulled from behind or the front depending on a posture of the person. In addition, it is convenient to use the upper handle when pulling a person on the ship.

To this end, the handles 801-1 and 801-2 may be vertically longitudinally formed to entirely cover the front portion 101, the connector 102, and the rear portion 103, and particularly may be divided into a front handle region 1101-1, an upper handle region 1101-2, and a rear handle region 1101-3 (see FIG. 11).

In addition, the life jacket 100' may include first and second fixers 701-1 and 702-2 to firmly fix the neck support 140 when the neck support 140 is opened by the aforementioned cutting line 130 to form the neck opening. For example, the first and second fixers 701-1 and 701-2 may be made of a Velcro material and stably fixed in a bonded state when adhered to each other. Particularly, when the first and second fixers 701-1 and 701-2 are fixed, the neck support 140 may be fixed in a bent state, so that the neck of the wearer may be supported more stably, thereby improving its convenience such that the wearer is not tired easily even when the wearer drifts for a long time.

Figure 13:
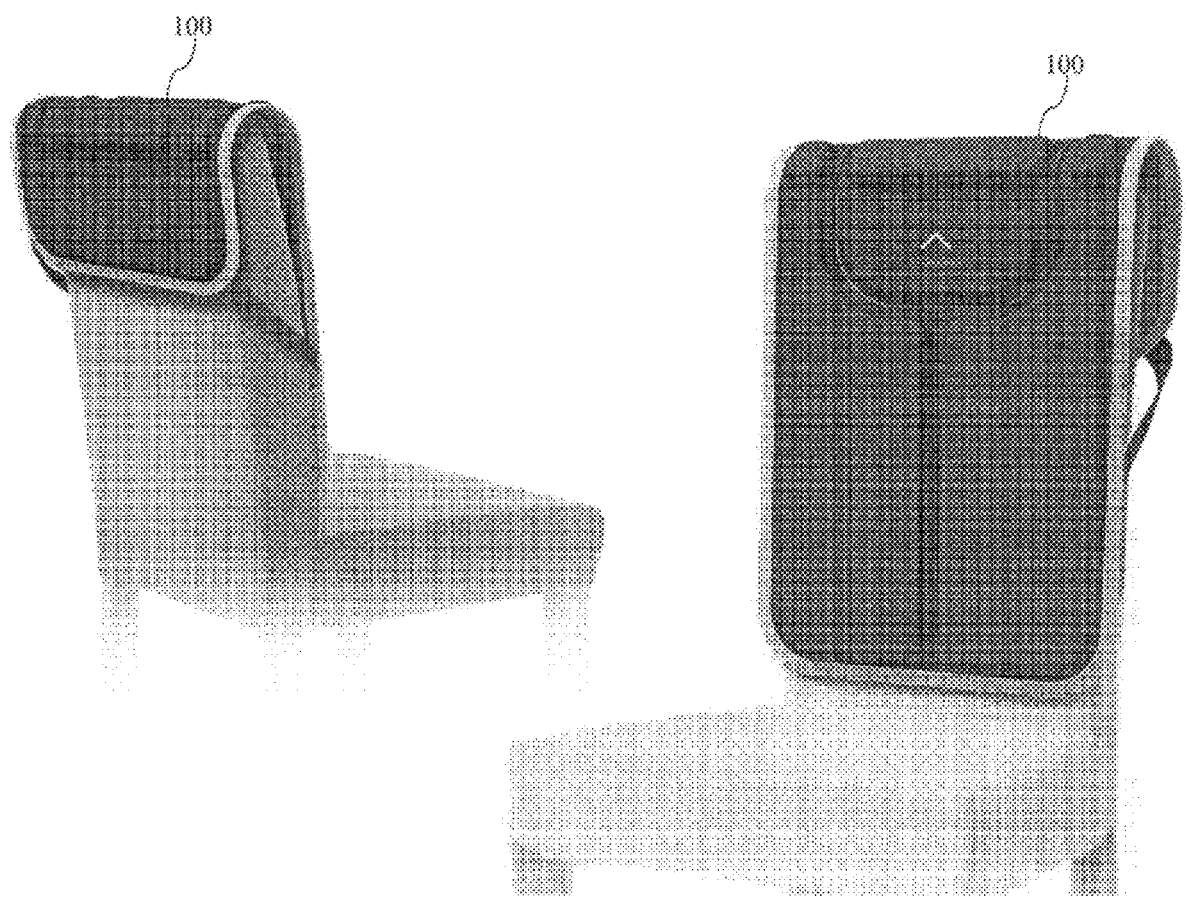
FIG. 13 shows a state in which the backrest cover 100 is fastened to a chair according to an exemplary embodiment of the present invention.

FIG. 13 shows a state in which the backrest cover 100 is fastened to a chair according to an exemplary embodiment of the present invention.

As shown therein, the backrest cover 100 that is worn securely on the backrest may improve seating feeling of the chair thanks to a cushion effect of the buoyant bodies themselves, and may be used as a life jacket in an emergency to promote safety of users.

Although explaining the backrest cover capable of being used as a life jacket according to the present invention which will be described by way of at least one exemplary embodiment, whereby the technical concept and the construction and operation of the present invention as not to be limited, to not to be limited/restricted by the description in the range of the technical concept of the present invention with reference to the drawings or figures. The concepts and embodiments of the invention presented herein may be used by those of ordinary skill in the art as a basis for modifying or designing a different structure to carry out the same purposes of this invention, and the present invention generally modified or changed equivalent structures by those having knowledge in the art belonging to the as being bound by the technical scope of the present invention described in the claims, the spirit and scope of the invention described in the claims various changes within the limits that do not depart, may be substituted and changed

The invention claimed is:

1. A backrest cover for covering a backrest, comprising:
    a front portion configured to cover a front surface of the backrest;
    a rear portion configured to cover a rear surface of the backrest;
    a connector configured to extend across an upper end of the backrest, connecting the front and back portions; and
    a buoyancy body provided in at least one of the front portion, the rear portion, and the connector
    wherein the backrest cover forms a U-shape cutting line for neck opening, one end of the neck opening isn't cut and remain attached to the backrest cover for forming a neck support,
    one side of the backrest cover functions as a backrest surface and the other side of the backrest cover functions as a life jacket surface so that the surface used as a backrest cover be turned over and used as a life jacket, the one side of the backrest cover is coated with at least one of a fluorescent material and a fluorescent color and forms handles to function as the life jacket surface, and the other side of the backrest cover is not coated with the fluorescent material or the fluorescent color and do not form handles to function as the backrest surface.

2. The backrest cover of claim 1, further comprising a fastening band configured to fix the front and rear portions to each other.

3. The backrest cover of claim 2, wherein the fastening band includes a first fastening band having a first end that is fastened to a lower end of the rear portion and a second fastening band that is fastened to a side surface of the front portion.

4. The backrest cover of claim 2, wherein the fastening band has a first end that is fastened to a lower end of the rear portion and two second ends divided in a 'Y' form, which are fastened to a left and a right of a lower end of the front portion.

* * * * *